United States Patent Office 3,048,522
Patented Aug. 7, 1962

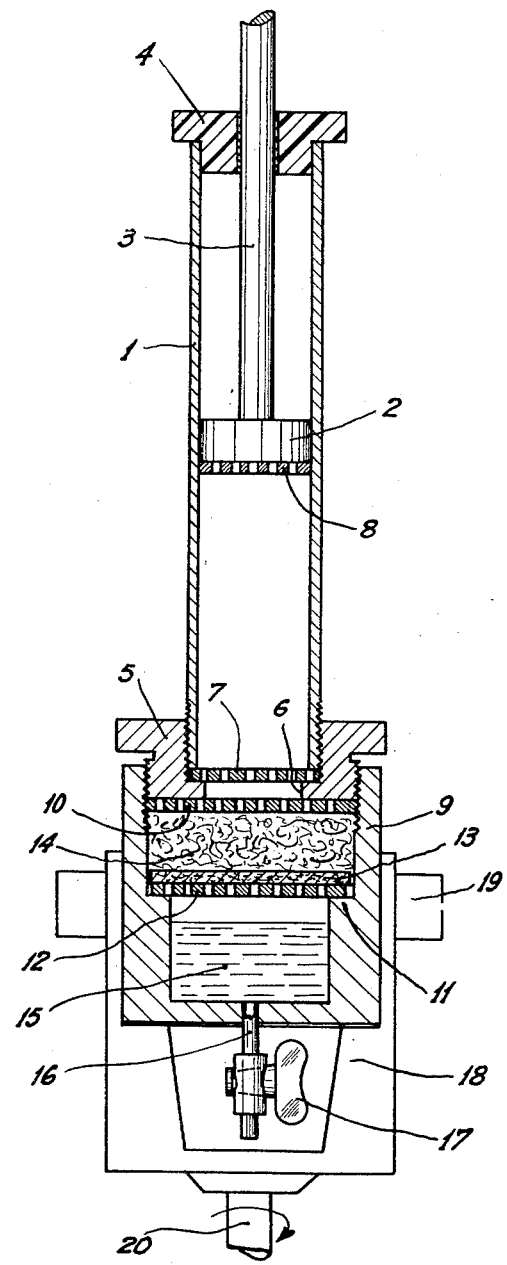

3,048,522
PROCESS FOR SEPARATING ENDOCELLULAR COMPONENTS AND A COMPOSITION PRODUCED THEREBY
Georges C. Velley, Paris, France, assignor to Laboratoires Millot, Paris, France, a company of France
Filed Aug. 4, 1959, Ser. No. 831,659
Claims priority, application France Aug. 13, 1958
2 Claims. (Cl. 167—74.6)

As conducive to a clear understanding of the invention, it is noted that so-called tissual therapy involves introducing connective tissue fragments into the human organism, at times with serious objections, especially in the case of senescent persons and those who are subject to fibromatous process already in course of development.

The stimulation of the connective system and the repercussions thereof in the form of fibrous hyperplasias may be counter-indicated for example with senescent patients.

I have discovered that organic cells freed from any supporting connective tissue ("ballast" substance) are free from the foregoing objections especially if derived from suitable animal organ cells.

It is an object of the invention to provide a new agency for controlling the metabolism of cells in a predetermined organ of a mammal.

Another object is to provide an accuratae therapy in contradistinction with organotherapy by means of whole tissues, without immediate or ensuing toxicity and without secondary effects.

Still another object is to provide new compositions which can be administered more simply with less hazards than crushed tissues, the injection of which latter may be likened to a surgical operation.

In studying the immuno-biological effects of three kinds of cell components from fetal organs, to wit nuclei, mitochondrias and cytoplasmic residue, I have found that it is particularly desirable selectively to use organites, i.e. nuclei and mitochondrias, freed from cytoplasmic residue. The cytoplasim is a jelly and not a fluid and will not pass through a filter.

More especially it has been found that the antigenic characters of the three main components of cells assert themselves as follows in the course of onto-genetic evolution:

(a) The nuclei of fetal organ cells are distinctive or characteristic neither of the organ nor of the species while the nuclei of adult organ cells are distinctive or characteristic of the species;

(b) The mitochondrias of fetal organ cells are not distinctive or characteristic of the species, but are characteristic of the organ (the same is true as regards mitochondrias from adult organ cells);

(c) The cytoplasmic residue is distinctive or characteristic neither of the species nor of the organ (while that from adult organ cells is distinctive or characteristic both of the species and of the organ).

Consequently my invention comprises a process for the treatment of a living mammal with a view to stimulating an organ thereof for preventive or curative therapeutical purposes, which process consists in administering to said being endonuclear components from the corresponding organ of an animal fetus, said endocellular components being substantially free from cytoplasmic residue.

The invention also comprises pharmaceutical compositions comprising endocellular components from a fetal organ, substantially free from cytoplasmic residue, in association with a pharmacologically acceptable vehicle, carrier or excipient, particularly suspensions of such endocellular components in an aqueous medium suitable for injection through parenteral route, in particular intramuscular route, or capable of being absorbed in the gastro-intestinal tract (pills or suppositories). Such compositions in ointment form may also be employed.

As an example reference will be had to calf fetus liver endocellular components suspended in a 5 percent aqueous solution of saccharose, particularly the endocellular components from 1 gram of fresh calf fetus liver (i.e. about from 400 million cells) in 5 ml. of said solution.

The organites may be isolated from fetal organ cells which after having been taken, have been ground and lyophilyzed.

My invention further comprises a method and an apparatus which enables a sufficiently accurate separation of endocellular organites from cell nucleus cytoplasmic residue to be effected on a commercial scale.

A feature of my apparatus comprises the combination of an enclosure open at the top and bottom thereof, with a pair of fine-mesh screens vertically spaced apart to define a cell receiving zone therebetween, driving means for rotating said screens in opposite directions so that the screens disintegrate cells frictionally without substantial crushing effect and separate cell elements from tissue elements, and a filter arranged below the lowermost screen for retaining tissue elements while allowing cell elements to pass therethrough.

The filter comprises a cotton layer and a nylon or other superpolyamide fabric. Below the filter, there may be a collector arranged to receive separated organites and it may contain for example the aqueous liquid which will form the continuous phase in the suspension to be administered for therapeutic purposes.

More particularly the apparatus may comprise a socket having a sump provided with a tap-off valve in the lower part thereof, and a filter with a superimposed cylinder the bottom of which is closed by one of the disintegrating screens in the lower part thereof, in combination with a piston which is adapted and arranged to close said cylinder and on the lower face of which the other disintegrating screen is provided, said socket being supported upon a revolving device, while said piston, arranged for free rotation in the cylinder is coupled with means for rotating it in opposite direction.

The apparatus may be constructed as shown on the appended drawing which is given solely for illustration purposes and shows a diagrammatic axial section of said apparatus.

The apparatus as shown comprises a cylinder 1 for example made of stainless steel in which a piston 2 is arranged for sliding and rotating movements, said piston having a stem 3 passed through an impervious, removable cap 4 for cylinder 1.

Screwed on the base portion of cylinder 1 is a ring having an inwardly directed flange 6 at the lower part thereof, a screen 7 at the lower end of cylinder 1 rests at its rim on flange 6; another screen 8 is attached in face to face contact with the lower face of piston 2; both screens are made of stainless steel wire, the mesh openings of which have dimensions from 30 to 100 microns.

Ring 5 is screwed into the upper part of a socket 9 and has a screen 10 similar to the above described screens on the lower face thereof. Socket 8 has an inwardly directed shoulder 11 on which another screen 12 also similar to the other screens is supported; arranged on the top of screen 12 is a disk 13 made of nylon fabric, a layer of filtering cotton 14 being interposed between screens 10 and 12.

The bottom of socket 9 provides a sump 15 adapted to receive a liquid and is provided with a take-off tube 16 having a cock 17.

Diagrammatically shown at 18 is a mounting in which socket 9 is clamped by wings 19 and which is rigid with a shaft 20 for driving it at a high velocity. The stem 3 of piston 2 is arranged to be coupled with means for rotating it at a high velocity in opposite direction.

For practical purposes, the apparatus as illustrated is placed in an isothermic enclosure which is maintained at a low temperature, preferably about 0° C., during the treatment.

In the use of the apparatus, cap 4 is removed, piston 2 taken out and the tissues from which cellular elements are to be recovered are placed on screen 7 in cylinder 1; said tissues are derived from fetal organs which were previously freed from fatty and connective tissues in a sterile medium then placed in sterile flasks containing a survival liquid and thereafter kept for a time at a temperature from 2 to 4° C.

In sump 15 of socket 9 is placed the aqueous liquid into which the cellular elements shall be suspended, e.g. a 5 percent, ice cooled aqueous solution of saccharose. Piston 2, then cap 4, are reset, stem 3 of piston 2 is coupled with the driving means therefor (not shown), then the socket 9 and piston 2 are caused to rotate in opposite directions. In the case of a cylinder 1 having a height of 300 mm. and an inner diameter of 45 mm., each one of the socket and piston may advantageously be rotated at 1000 r.p.m. in opposite directions. At the same time a gentle pressure is exerted, for example manually, on the stem 3 of piston 2.

During the operation the enclosure in which the apparatus is placed is maintained at a temperature of about 0-2° C.

As the operation is ended socket 9 is separated from mounting 18 and through tube 16, the suspension may be distributed in small bottles as commonly used for penicillin.

As many changes could be made in the above described process and apparatus for separating endocellular components and compositions comprising such components, without departing from the scope of the claims, it is intended that all matter contained in the above description or shown in the accompanying drawing shall be interpreted as illustrative and not in a limiting sense.

Having thus described my invention, what I claim as new and desire to secure by Letters Patent of the United States is:

1. Process for segregating endocellular components of biological cells, said cells being derived from animal fetus liver, which comprises confining the cells between fine mesh screens, axially revolving said screens at high speed in opposed directions, while urging such screens toward each other, with resultant mild disintegration of the cells frictionally, into substantially their whole components, filtering the disintegrated cells to transmit the whole endocellular components and to intercept the cytoplasmic residue of the cells and collecting the endocellular components thus passed, said endocellular components being dispersed as they are collected, in pharmacologically acceptable liquid, and said liquid being selected from the group consisting of parenterally injectable aqueous liquids and gastrointestinally absorbable aqueous liquids, and said liquid including 5% by weight of saccharose.

2. The composition obtained by the process of claim 1 in that the organ is calf fetus liver and the pharmacologically acceptable liquid is 5 percent by weight aqueous solution of saccharose.

References Cited in the file of this patent

UNITED STATES PATENTS

| | | |
|---|---|---|
| 1,771,526 | Carver | July 29, 1930 |
| 1,999,241 | Kiergard | Apr. 30, 1935 |
| 2,154,649 | Wishinsky | Apr. 18, 1939 |
| 2,162,863 | Ripke | June 29, 1939 |
| 2,239,345 | Sperti | Apr. 22, 1941 |
| 2,910,406 | Novak | Oct. 27, 1959 |

FOREIGN PATENTS

| | | |
|---|---|---|
| 207,573 | Great Britain | May 30, 1922 |